Patented Feb. 6, 1934

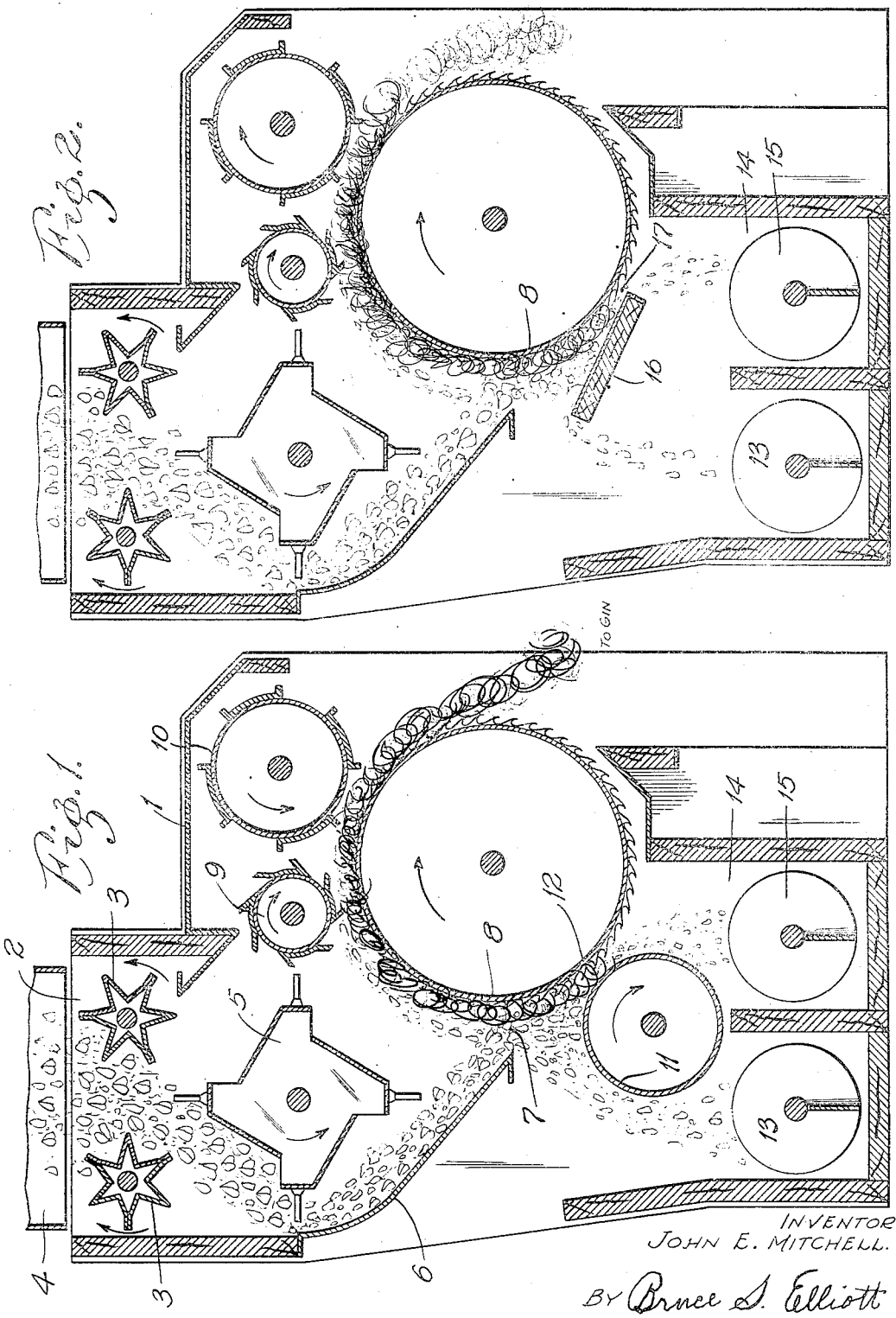

1,945,783

UNITED STATES PATENT OFFICE 1,945,783

COTTON EXTRACTING AND CLEANING MACHINE

John E. Mitchell, Dallas, Tex.

Application February 18, 1931. Serial No. 516,628

4 Claims. (Cl. 19—36)

This invention relates to cotton cleaning machines of the type illustrated and described, as to one form thereof, in my pending application Ser. No. 464,560, filed June 28, 1930 for a Method of cleaning cotton. In said application I have illustrated a cotton cleaning machine utilized in practicing a part of the method claimed in said application. This machine is believed to be distinctly novel, apart from the method in which it is employed, and the present application is directed to covering broadly the novel subject matter involved in the machine referred to.

In the accompanying drawing—

Fig. 1 is a longitudinal sectional view through a cotton cleaning machine constructed according to my invention; and Fig. 2 is a similar view illustrating a modified construction.

Referring to Fig. 1 of the drawing, the numeral 1 indicates, generally, the casing of my improved machine, providing in its top an opening 2, in which is located a pair of feed rollers 3, located immediately under the end of a distributing pipe 4, from which cotton is discharged through the opening 2. Located below the feed rollers 3 is a rotatable breaking cylinder 5, which rotates in proximity to a hull-board 6, the lower end of which defines the size of an opening 7 past a saw cylinder 8. Mounted above the saw cylinder is a kicker roll 9, and at the rear of this kicker roll is a doffing roll 10 for removing the cotton from the saw cylinder 8. The cotton removed from the saw cylinder by the doffing roll passes directly to the gin on which the cleaning machine described is mounted.

The opening 7 past saw cylinder 8 is made sufficiently large to permit of the free discharge of hulls, trash, bolls and all small lock cotton not carried up by the saw cylinder. In order to avoid treating this entire product to recover the waste cotton therefrom, I provide novel means for separating the discharged product passing through opening 7 into two streams. In one form of the invention, that shown in Fig. 1, I provide a smooth roller 11, which defines the size of a relatively narrow opening 12 past the saw cylinder, and, as shown by the arrow, is rotated as to its upper side in a direction toward the saw cylinder. The opening 12 is sufficiently large to permit the passage through it of small hull particles, trash, sand, and the like, but not large enough to permit the passage through of hulls, or large hull particles, or of any cotton of value. This cotton will usually be in the form of small locks or wads, and will be knocked back together with the large pieces of hulls and bolls, or partly open bolls, over the roller 11 to a conveyor 13, whence it is passed through suitable pipes to a reclaiming machine of any preferred construction, which recovers the cotton that is mixed with the hulls and hull particles.

The small hull particles, trash, sand and the like passing through the opening 12 fall into a trough 14, whence a conveyor 15 conducts them to a suitable discharge pipe (not shown) which leads to the outside of the machine.

The machine illustrated in Fig. 2 differs from the machine of Fig. 1 only in the fact that, in place of the roller 11, I employ a stationary hull board 16, the lower end of which defines the size of an opening 17 past the saw cylinder and which hull-board is of a width to permit the hulls and lock cotton to be knocked over the rear end thereof and into the conveyor 13 by the saw cylinder 8, exactly as occurs in the use of the roller 11. The latter, therefore, may be regarded as a live, or active hull-board.

In two prior patents obtained jointly by myself and one, Dennis Parks, and numbered respectively 1,332,913 and 1,348,031, there are illustrated and described two different mechanisms for separating the waste products from the extracting machine into two different streams, one stream consisting of refuse with no cotton in it, and the other stream including with the hulls partly open bolls and some cotton; and in the specification of both patents it is stated that the unbroken bolls and the small amount of cotton escaping with them can be conducted to a separate recleaning machine for reclaiming the cotton therefrom.

The objection to the two machines covered by the patents referred to is that they do not make a satisfactory separation between the two kinds of refuse. In each case, the stream containing unbroken bolls and wasted cotton is likely also to contain a large amount of dirt, leaf-particles, shale, and other fine trash, which becomes so intimately entangled with the fibers of the cotton that subsequent recleaning processes cannot entirely separate it, and the cotton reclaimed from this refuse is so inferior in quality that it has to be handled as a separate grade; that is to say, it must be kept out of the main stream of cotton going to the gins.

In either form of the machine illustrated in the present application, this objection is overcome. The opening 12, while sufficiently large to permit dirt, leaf-trash, and other fine refuse to escape into the chamber 14, is not large enough to permit the passage of large hull particles, or of any cotton of value. Therefore, the stream going over the roller 11 into the conveyor 13 consists only of clean hulls with occasional locks of cotton. The subsequent separation of the cotton from these clean hulls is a simple matter, and the reclaimed cotton, not being contaminated with the dirt and fine trash, is in no degree inferior in quality to the main stream of cotton going to the gin and can be returned to this main stream instead of being kept out as a separate grade of very little value.

With the use of the machine illustrated in Fig. 2, the fine trash, containing no cotton of value, slides down the hull-board 16 through the opening 17 between its lower end and the saw cylinder into the conveyor 15, whereas, the hulls, free of dirt and trash with some cotton, are kicked over the top edge of this hull-board into the conveyor 13, and thereafter subjected to the reclaiming operation.

I wish it understood that the invention is capable of other embodiments than those illustrated and described without departing from the spirit thereof as outlined in the broader clauses of the claims following:

I claim:—

1. In a cotton extracting and cleaning machine, in combination with extracting mechanism including a saw cylinder adapted to remove the main body of cotton and a hull board member providing a discharge opening past the saw cylinder for the escape of small refuse, hulls, bolls, and small lock cotton, separate compartments located below said saw cylinder, a second hull-board member defining the size of a second opening past said saw cylinder, narrower than the first and leading into one of said compartments, and of a size to permit only the fine trash, sand, and the like in the product falling through said first opening, to pass through the same, said second hull-board member being so positioned that hulls and lock cotton contained in said product and knocked back by the saw cylinder may pass over the same and fall into the other of said compartments.

2. In a cotton extracting and cleaning machine, in combination with extracting mechanism including a saw cylinder adapted to remove the main body of cotton and a hull-board member providing a discharge opening past the saw cylinder for the escape of small refuse, hulls, bolls, and small lock cotton, separate compartments located below said saw cylinder, a rotary hull-board defining the size of a second opening past said saw cylinder, narrower than the first and leading into one of said compartments, and of a size to permit only the fine trash, sand, and the like in the product falling through said first opening to pass through the same, said rotary hull-board being so positioned that hulls and lock cotton contained in said product and knocked back by the saw cylinder may pass over the same and fall into the other of said compartments.

3. A cotton extracting and cleaning machine comprising, in combination, a saw cylinder, a main hull-board defining the size of an opening past such saw cylinder for the escape therethrough of all products fed into the machine other than the cotton removed by the saw cylinder, a supplementary hull-board member located below said opening and providing a second opening past such saw cylinder narrower than the first and through which only fine trash, dirt and the like, containing no cotton of value can be discharged, separate compartments located below said hull-board member, the latter being positioned intermediate said compartments, whereby, fine trash, dirt, and the like, passing through said narrow opening, may fall into one compartment, and hulls and cotton knocked back by said saw cylinder may pass over said hull-board member and fall into the other compartment, and means in said latter compartment for continuously removing the hulls and cotton falling into the same.

4. In a cotton cleaning machine, in combination with extracting mechanism including a saw cylinder adapted to remove the main body of cotton and a hull board member providing a discharge opening past the saw cylinder of a size to permit the free escape of small refuse, hulls, bolls, and small lock cotton, a second hull board member defining the size of a second opening past said saw cylinder, narrower than the first, and of a size to permit only the fine trash, sand, and the like in the product falling through said first opening, to pass through the same, said second hull board member being so positioned that hulls and lock cotton contained in said product may be knocked back by the saw cylinder over the same, and means for maintaining separated the fine trash, sand and the like passing through said second opening from the hulls and lock cotton knocked back over the second hull-board member.

JOHN E. MITCHELL.